(12) United States Patent
Ren et al.

(10) Patent No.: US 11,067,992 B2
(45) Date of Patent: Jul. 20, 2021

(54) PATH PLANNING METHOD AND SYSTEM FOR SELF-DRIVING OF AUTONOMOUS SYSTEM

(71) Applicant: Hefei University of Technology, Anhui (CN)

(72) Inventors: Minglun Ren, Anhui (CN); Xiaodi Huang, Anhui (CN); Chenze Wang, Anhui (CN); Bayi Cheng, Anhui (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 16/822,820

(22) Filed: Mar. 18, 2020

(65) Prior Publication Data

US 2020/0371520 A1  Nov. 26, 2020

(30) Foreign Application Priority Data

May 24, 2019  (CN) .......................... 201910437563.X (51) Int. Cl.
*G05D 1/02* (2020.01)
*G01S 19/42* (2010.01)
*G05B 17/02* (2006.01)

(52) U.S. Cl.
CPC ............ *G05D 1/0212* (2013.01); *G01S 19/42* (2013.01); *G05B 17/02* (2013.01); *G05D 2201/0212* (2013.01)

(58) Field of Classification Search
CPC .......... G05D 1/0212; G05D 2201/0212; G01S 19/42; G01S 5/02; G05B 17/02; G01C 21/00; G06Q 10/047; G06N 3/006
See application file for complete search history.

(56) References Cited

FOREIGN PATENT DOCUMENTS

| CN | 104332053 A | 2/2015 |
| CN | 106292697 A | 1/2017 |
| CN | 109737970 A | 5/2019 |

*Primary Examiner* — James J Lee
*Assistant Examiner* — Shon G Foley (57) ABSTRACT

The present invention provides a path planning method and system for self-driving of autonomous system, and relates to the technical field of autonomous systems. The method comprises following steps of: acquiring a path optimization function of an agent; converting, based on fixed-point theorems, the path optimization function of the agent into an equivalent fixed-point equation; acquiring a complete simplex sequence based on the fixed-point equation; and, determining, based on the complete simplex sequence, an initial population size and an initial position of particles for particle swarm optimization to obtain the best path planning of the agent. In the present invention, the extremal optimization of the path optimization function of the agent is converted into solving of the fixed-point equations, and initial parameters for particle swarm optimization are determined by the complete simplex sequence.

4 Claims, 7 Drawing Sheets

PATH PLANNING METHOD AND SYSTEM FOR SELF-DRIVING OF AUTONOMOUS SYSTEM

CROSS-REFERENCE TO RELATED APPLICATIONS

This application claims the benefit of priority from Chinese Patent Application No. 201910437563.X, filed on May 14, 2019. The content of the aforementioned application, including any intervening amendments thereto, is incorporated herein by reference in its entirety.

TECHNICAL FIELD

The present invention relates to the technical field of autonomous systems, and in particular to a path planning method and system for self-driving of autonomous system.

BACKGROUND OF THE PRESENT INVENTION

With the continuous innovation and breakthrough in research on artificial intelligence and intelligent manufacturing fields, intelligent autonomous systems such as agents, intelligent automobiles and unmanned aerial vehicles are applied more and more popularly in various fields. How to realize autonomous navigation during the control to the intelligent autonomous systems has always been the focus of research. As an important part of autonomous navigation, path planning mainly aims to find a best path to move an intelligent autonomous system from an initial position to a target position in an operating environment, without collision with obstacles.

In the research in the prior art, Particle Swarm Optimization (PSO) has been widely used in the path planning of the agent. However, as a typical intelligent swarm algorithm, PSO also faces a tradeoff between co-exploitation and development, that is, how to allocate the capabilities of particles to perform global search in an unknown region and continuously perform local search on an original search trajectory during the search process. In order to address this problem, many scholars expect to realize the best planning of the movement path of the intelligent autonomous system by continuously optimizing the algorithm design. In the existing research on parameter improvement, dynamic and adaptive adjustment strategies can greatly improve the robustness of the application of PSO in the path planning of the agent, and have become the current research mainstream.

However, in the existing research on the setting of PSO parameters, the parameters are set independently, and the majority of adjustment strategies for other algorithm parameters such as the initial state of the particle population and the flying speed are determined by empirical reference or random generation. The uncontrollability is high and the robustness of the agent in the path planning process is reduced.

SUMMARY OF THE PRESENT INVENTION

(1) Technical Problem to be Solved

In view of the deficiencies of the prior art, the present invention provides an optimization method and system for autonomous path planning of an agent in an autonomous system, which solve the problem of low robustness of an agent in an existing system during the path planning and optimization process.

(2) Technical Solutions

For this purpose, the present invention is implemented by the following technical solutions.

The present invention provides a path planning method for self-driving of autonomous system, which is executed by an agent, the method including following steps of:

S1: acquiring a path optimization function of the agent;

S2: converting, based on fixed-point theorems, the path optimization function of the agent into an equivalent fixed-point equation;

S3: acquiring a complete simplex sequence based on the fixed-point equation; and S4: determining, based on the complete simplex sequence, an initial population size and an initial position of particles for particle swarm optimization to obtain the best path planning of the agent.

Preferably, the step S2 is specifically:
based on $$\begin{cases} \min y = f(X) \\ \text{st. } X \in \{X \mid g_i(X) \leq 0, i = 1, 2, \ldots, m\} \end{cases},$$

constructing a fixed-point equation $F(X)=X-f(X)$, wherein, according to the fixed-point theorems, satisfying a condition of $f(X^*)=0$ if $X^*$ is a solution to the fixed-point equation, so that a minimum value of the path optimization function $y=f(X)$ at the point $X^*$ is obtained;

where:
$f(X)$ is the path optimization function of the agent;
$X$ is an n-dimensional optimization variable; and
$g_i(X)$ is m constraint functions in a function feasible region.

Preferably, the step S3 is specifically:
according to the fixed-point theorems, introducing an approximate fixed point to replace a precise fixed point: let any $\varepsilon>0$, considering $X$ as an approximate fixed point of the $f(X)$ if $|X-f(X)|<\varepsilon$, where $|X-f(X)|$ represents the modulus of a vector, specifically:

S301: dividing a search space of the fixed-point equation, specifically:
in an n-dimensional Euclidean space $R^n$, dividing a search space of the fixed-point equation into uniform polyhedrons by a n-family straight line $x_i=mh_i$ ($1=1,2,\ldots,n$), where m is precision control;

S302: processing the divided search space by a simplicial algorithm to obtain simplexes, wherein:
for the Euclidean space $R^n$, $N=\{1,2,\ldots,n\}$, $\pi$ is the permutation of N, and n basis vectors $u^1,\ldots,u^n$ of $R^n$, which are n columns in an identity matrix of order n, satisfy the following condition: $u=u^1+\ldots+u^n=(1,\ldots,1)$; let $K_1^0$ be a set of integer points in $R^n$, if $y^0 \in K_1^0$, a n-dimensional simplex $<y^0,y_1,\ldots,y^n>$ is denoted by $k_1(y^0,\pi)$, where $y^i=y^{i-1}+u^{\pi(i)}$, $i \in N$, and a set of $k_1(y^0,\pi)$ is denoted by $K_1$; and S303: labeling the simplexes to output a complete simplex sequence, specifically:
labeling the simplexes by integer labeling or vector labeling, obtaining a complete simplex sequence satisfying labeling requirements according to a logistic discrimination, and using a value range of the complete simplex sequence as an updated search space.

Preferably, the step S4 is specifically:

in an n-dimensional solution space, if the position of each particle is a complete simplex sequence $x_i=(x_{i1},x_{i2},\ldots,x_{in})$, the number of complete simplex sequences represents the population size, the flying speed is $v_i=(v_{i1},v_{i2},\ldots,v_{in})$, the best position of individual particles is denoted by $p_{best}=(p_{i1}, p_{i2},\ldots,p_{in})$, the best global position is $g_{best}=(p_{g1}, p_{g2},\ldots,p_{gn})$, for the current particle, adjusting the current position $x_{id}$ and the current speed $v_{id}$ of this particle according to the following formulae:

$$v_{id}(t+1) = \omega v_{id}(t) + c_1(p_{id} - x_{id}) + c_2(p_{gd} - x_{id})$$

$$x_{id}(t+1) = x_{id}(t) + v_{id}(t+1)$$

$$\begin{cases} v_{id} = v_{max}, & v_{id} > v_{max} \\ v_{id} = -v_{max}, & v_{id} < -v_{max} \end{cases}$$

where:

$p_{id}$ is the current best position of individual particles;

$p_{gd}$ is the current best global position;

$v_{max}$ represents the maximum flying speed of particles;

$-v_{max}$ represents the minimum flying speed of particles;

$\omega$ is an inertia weight; and $c_1$ and $c_2$ are acceleration constants.

Preferably, the value range of the complete simplex sequence is used as a value range of the flying speed.

Preferably, the inertia weight is set in the following way:

by an inertia decreasing weight, the value of the weight $\omega$ gradually decreases in iterations, specifically:

$$\omega = \omega_{max} - \frac{n \cdot (\omega_{max} - \omega_{min})}{n_{max}},$$

where:

$\omega_{max}=0.9$; and $\omega_{min}=0.4$.

The present invention further provides an optimization system for autonomous path planning of an agent in an autonomous system, including an agent, the agent including:

at least one storage unit; and at least one processing unit;

wherein the at last one storage unit stores at least one instruction that, when loaded and executed by the at least one processing unit, implements the following steps:

S1: acquiring a path optimization function of the agent;

S2: converting, based on fixed-point theorems, the path optimization function of the agent into an equivalent fixed-point equation;

S3: acquiring a complete simplex sequence based on the fixed-point equation; and S4: determining, based on the complete simplex sequence, an initial population size and an initial position of particles for particle swarm optimization to obtain the best path planning of the agent.

(3) Beneficial Effects

The present invention provides an optimization method and system for autonomous path planning of an agent in an autonomous system. Compared with the prior art, the present invention has the following beneficial effects.

In the optimization method and system for autonomous path planning of an agent in an autonomous system provided by the present invention, the extremal optimization of the path optimization function of the agent is converted into solving of the fixed-point equations, and initial parameters for particle swarm optimization are determined by the complete simplex sequence. The complete simplex sequence contains almost all extreme points of the path optimization function, so the diversity of population and the effectiveness of the particle search direction are ensured, and the robustness of the agent in the autonomous system during the path planning process and the efficiency in searching the best path are thus improved.

BRIEF DESCRIPTION OF THE DRAWINGS

To describe the technical solutions in the embodiments of the present invention or in the prior art more clearly, the accompanying drawings to be used in the descriptions of the embodiments or the prior art will be briefly described below. Apparently, the accompanying drawings to be described hereinafter are some of the embodiments of the present invention, and a person of ordinary skill in the art can obtain other drawings according to these drawings without paying any creative effort.

DETAILED DESCRIPTION OF THE PRESENT INVENTION

To make the purposes, technical solutions and advantages of the embodiments of the present invention clearer, the technical solutions in the embodiments of the present invention will be described clearly and completely. Apparently, the embodiments to be described are some but not all the embodiments of the present invention. All other embodiments obtained by a person of ordinary skill in the art based on the embodiments of the present invention without paying any creative effort shall fall into the protection scope of the present invention.

The embodiments of the present application provide an optimization method and system for autonomous path planning of an agent in an autonomous system, which solve the problem of low robustness of an agent during the path planning process in the prior art and improve the robustness of an intelligent autonomous system during the path panning process.

In order to solve the above technical problem, the general concept in the technical solutions of the embodiments of the present application will be described below.

In the optimization method and system for autonomous path planning of an agent in an autonomous system provided in the embodiments of the present invention, the extremal optimization of the path optimization function of the agent is converted into solving of the fixed-point equations, and initial parameters for particle swarm optimization are determined by the complete simplex sequence. The complete simplex sequence contains almost all extreme points of the path optimization function, so the diversity of population and the effectiveness of the particle search direction are ensured, and the robustness of the agent in the autonomous system during the path planning process and the efficiency in searching the best path are thus improved.

To better understand the technical solutions, the technical solutions will be described below in detail by specific implementations with reference to the accompanying drawings in this specification.

Figure 1:
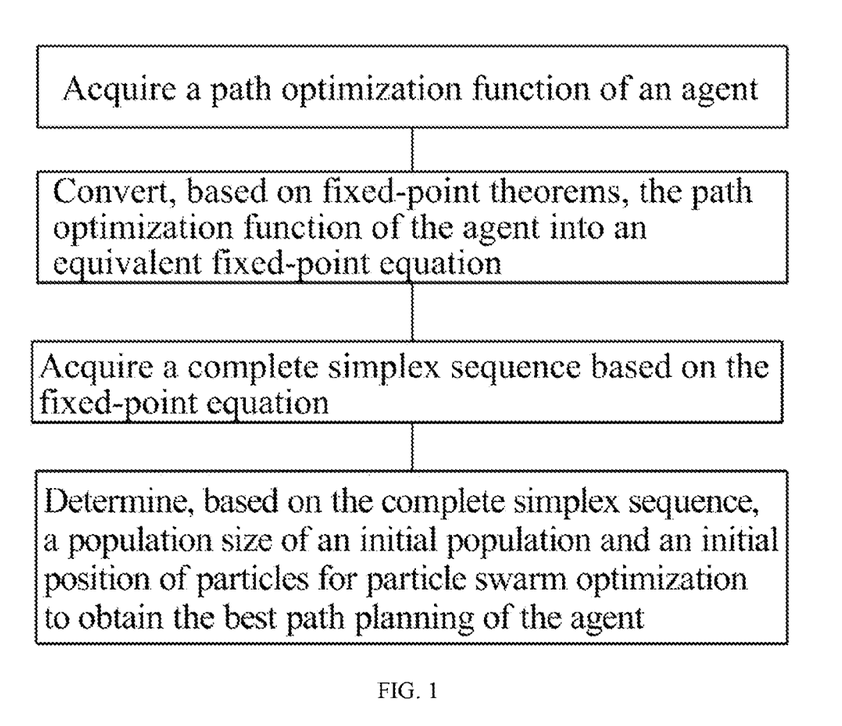
FIG. 1 is a flowchart of a path planning method for self-driving of autonomous system according to an embodiment of the present invention.
Figure 2A:
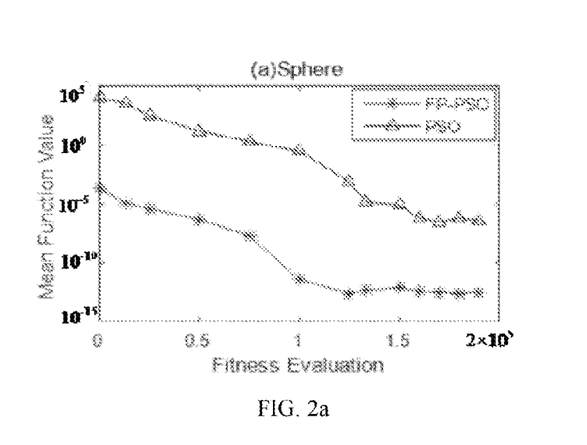
FIG. 2 shows optimization efficiency convergence curves of the method of the present invention and a conventional method, when the target collaboration function is non-rotational (i.e., in a simple operating environment)
Figure 2B:
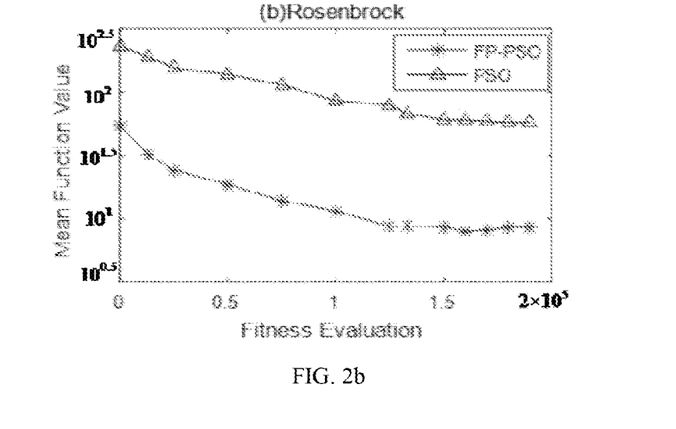
Figure 2C:
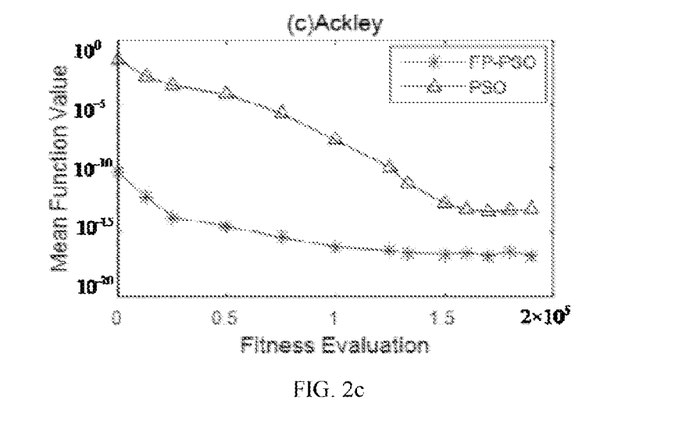
Figure 2D:
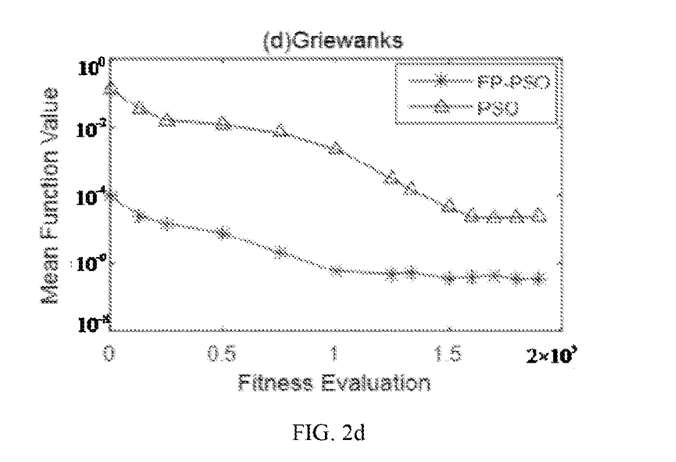
Figure 2E:
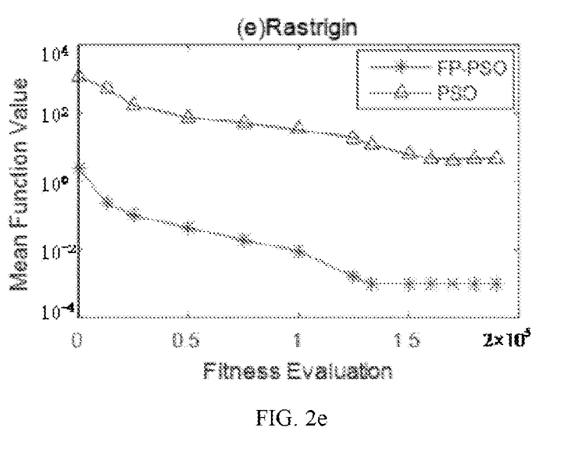

An embodiment of the present invention provides a path planning method for self-driving of autonomous system, which is executed by an agent. As shown in FIG. 1, the method includes following steps of:

S1: acquiring a path optimization function of the agent;

S2: converting, based on fixed-point theorems, the path optimization function of the agent into an equivalent fixed-point equation;

S3: acquiring a complete simplex sequence based on the fixed-point equation; and S4: determining, based on the complete simplex sequence, an initial population size and an initial position of particles for particle swarm optimization to obtain the best path planning of the agent.

During the specific implementation of this embodiment of the present invention, the extremal optimization of the path optimization function of the agent is converted into solving of the fixed-point equations, and initial parameters (initial population size and initial position of particles) for particle swarm optimization are determined by the complete simplex sequence. The complete simplex sequence contains almost all extreme points of the path optimization function, so the diversity of population and the effectiveness of the particle search direction are ensured, and the robustness of the intelligent autonomous system during the path planning process and the efficiency in searching the best path are thus improved.

The steps will be described below in detail.

An embodiment of the present invention provides a path planning method for self-driving of autonomous system, which is executed by an agent. The agent is a computing entity which is resided in a certain environment, can continuously and autonomously play its role, and has the characteristics of residence, reactivity, sociality, initiative and the like. This method includes steps S1 to S4.

S1: A path optimization function of the agent is acquired.

Specifically, a data processing module inside the agent constructs an optimization function of the agent according to data such as the driving space, speed and current position of the agent.

S2: Based on fixed-point theorems, the path optimization function of the agent is converted into an equivalent fixed-point equation.

Wherein, the fixed-point theorems are as follows:

Theorem 1: let X be a subset of $R^n$, if each point x in X corresponds to a definite $f(x) \in X$, f is a self-mapping of X and denoted by: $f: X \to X$.

Theorem 2: let X be a non-empty set and $f: X \to X$ be a self-mapping of X, if $x^* \in X$ and $f(x^*)=x^*$ is satisfied, $x^*$ is considered as a precise fixed point of f.

Theorem 3: let $(X,\rho)$ be a metric space and $T: X \to X$ be a mapping, if $L \in [0,1)$ so that, for any $x,y \in X, \rho(T(x),T(y)) \leq L\rho(x,y)$, then T is considered as a contraction mapping in X.

Theorem 4: approximate fixed point: let $\varepsilon$ be any positive number, if, for the contraction mapping $T: X \to X$, $|x-f(x)|$ represents the modulus of a vector $x-f(x)$ in an n-dimensional Euclidean space $R^n$, and if there is a point $x^*$ satisfying $|x^*-f(x^*)|<\square m$ $x^*$ is considered as an approximate fixed point of f.

Theorem 5: the n-dimensional Euclidean space is divided to obtain such a polyhedron: by the mapping f, the first coordinate component of the first vertex of the polyhedron decreases, the second coordinate component of the second vertex decreases, the $n^{th}$ coordinate component of the $n^{th}$ vertex decreases, and the $n^{th}$ coordinate component of the $(n+1)^{th}$ vertex remains unchanged. If the diameter of the polyhedron is small enough, the (n+1) vertices of the polyhedron will not change too much by the mapping f. Such a polyhedron is called complete simplex, and each vertex may be considered as a fixed point.

Banach fixed-point theorem, also referred to as a contraction mapping theorem: let $(X,\rho)$ be a non-empty complete metric space and $T: X \to X$ be a contraction mapping, T has a unique fixed point in X The Banach fixed-point theorem shows the existence and uniqueness of the solution to the fixed-point equation $T(x)=x$.

The path optimization function of the agent is converted into an equivalent fixed-point equation:

$$\begin{cases} \min y = f(X) \\ \text{st.} \quad X \in \{X \mid g_i(X) \leq 0, i=1, 2, \ldots, m\} \end{cases}$$

where:

f(X) is the path optimization function of the agent;

X is an n-dimensional optimization variable; and $g_i(X)$ is m constraint functions in a function feasible region.

Maximum/minimum values of the path optimization function $y=f(X)$ are calculated (the maximum value and the minimum value can be converted mutually, and the minimum value is used as an example in this embodiment of the present invention). If the path optimization function is derivable everywhere in the domain of definition, the maximum/minimum values appear at $f'(X)=0$ inevitably. Otherwise, a point of $f'(X)=0$ may be an extreme value, an inflection point or the like, and may not be the maximum/minimum values. Points of $f'(X)=0$ are selected by constructing the fixed-point equation, and then the algorithm search space may be greatly reduced by the path optimization function. Therefore, the fixed-point equation $F(X)=X-f'(X)$ is constructed; then, according to the theorem 2 in the fixed-point theorems, if there is a precise fixed point $X^*$ in the function F(X), $F(X^*)$ $X^*-f'(X^*)=X^*$ is satisfied inevitably. Thus, $f'(X^*)=0$ can be obtained, and a value of the path optimization function $y=f(X)$ at the point $X^*$ can be obtained.

S3: A complete simplex sequence is acquired based on the fixed-point equation.

Specifically, in practice, although the existence of fixed points can be proved, it usually needs very high computation overhead to obtain an extract solution by numerical calculation. For example, the extract solution to $x^2-2=0$ is infinite. An approximate value must be taken to participate in the subsequent calculation. Therefore, in order to ensure the stable convergence of the solution process, in accordance with the theorem 4 in the fixed-point theorems, an approximate fixed point is introduced to replace a precise fixed point: let any $\varepsilon>0$, if $|X-f(X)|"<\varepsilon$, X is considered as an approximate fixed point of f(X), where $|X-f(X)|$ represents the modulus of a vector.

The algorithm framework for searching the approximate fixed point by simplicial algorithm is shown below. Specifically, steps S301 to S303 are included.

S301: A search space of the fixed-point equation is divided, specifically:

In an n-dimensional Euclidean space $R^n$, a search space of the fixed-point equation is divided into uniform polyhedrons by a n-family straight line $x_i mh_i$ (i=1,2, ... ,n), where m is precision control. For high-precision optimization in a particular field, the step size may be appropriately refined, but a too fine step size will increase the algorithm complexity and reduce the operation efficiency. In this embodiment of the present invention, the value range of the complete simplex sequence is used as an updated search space. In this way, the range of the search space is narrowed, and the solution efficiency is improved.

S302: The divided search space is processed by simplicial algorithm to obtain simplexes, specifically:

For the Euclidean space $R^n$, $N=\{1,2, \ldots ,n\}$, $\pi$ is the permutation of N. n basis vectors $u^1, \ldots, u^n$ of $R^n$, which are n columns in an identity matrix of order n, satisfy the following condition: $u=u^1+ \ldots +u^n=(1, \ldots ,1)$. Let $K_1^0$ be a set of integer points in $R^n$ (a set of points where all coordinate components are integers), if $y^0 \in K_1^0$, a n-dimensional simplex $<y^0,y^1, \ldots ,y^n>$ is denoted by $k_1(y^0,\pi)$, where $y^i=y^{i-1}+u^{\pi(i)}, i \in N$. A set of $k_1(y0, \pi)$ forms a $K_1$ subdivision.

The divided search space is processed simplicial algorithm. Due to the change of the permutation $\pi$ of N, n!n-dimensional simplicial algorithms are formed in the positive side starting from each integer point $y^0$ in $R^n$. Thus, a $K_1$ subdivision of the whole $R^n$ is obtained.

S303: The simplexes are labeled to output a complete simplex sequence, specifically:

Vertices of the simplex obtained after the $K_1$ subdivision are labeled, and a complete simplex is found by a logic rule. In this way, a fixed point can be identified. There are two labeling rules: integer labeling and vector labeling.

The number of iterations for the integer labeling is several times more than that for the vector labeling, but the complexity of a single algorithm cycle is low. The vector labeling is more complicated than the integer labeling in a single cycle, but the number of iterations is less. For a complex function, the computation iteration will take a lot of time, so the number of iterations must be as less as possible. In this case, the vector labeling is superior to the integer labeling. If the function calculation is simple, more time will be saved by using the integer labeling. The specific rules are as follows.

Vector labeling: according to $l(x)=f(x)-x$, a $(n+1)\times(n+1)$ matrix can be obtained:

$$L\sigma = \begin{pmatrix} 1 & \cdots & 1 \\ \vdots & \ddots & \vdots \\ l(y^0) & \cdots & l(y^n) \end{pmatrix},$$

which is denoted by a labeling matrix of the n-dimensional simplex $\sigma=<y^0,y^1, \ldots ,y^n>$. If the linear equation $L_\sigma w=v$ is solvable (where $v=(1,2, \ldots ,0)^T$), the simplex is a complete simplex, and $x^*=\Sigma_{i=1}^n w_i y^i$ is an approximate fixed point.

Integer labeling: according to the formula $$\begin{cases} 0, \text{if } F_i \leq 0, i=1, 2, \ldots, n \\ i_{max}, \text{if } F_i > 0 \& F_j \leq 0, \forall j < i \end{cases},$$

vertices of the simplex are labeled to obtain a sequence $L\sigma=(0, 1, 2 \ldots )$, which is denoted by a labeling sequence of the n-dimensional simplex $\sigma=<y^0,y^1, \ldots ,y^n>$. In the Euclidean space $R^n$, the simplex labeled with the sequence (0,1,2, ... ,n) is a complete simplex, and each vertex of the simplex may be considered as an approximate fixed point.

In the application of the path planning of the autonomous system, fixed points are solved by different labeling methods according to the complexity of the path optimization function and the constraint function, thus balancing the calculation speed and the solution precision of the algorithm.

S4: An initial population size and an initial position of particles for PSO are determined based on the complete simplex sequence to obtain the best path planning of the agent, specifically:

The initial population size and the initial position of particles for particle swarm optimization are determined based on the complete simplex sequence.

In an n-dimensional solution space, if the position of each particle is a complete simplex sequence $x_i=(x_{i1},x_{i2}, \ldots ,x_{in})$, the number of complete simplex sequences represents the population size, the flying speed is $v_i=(v_{i1},v_{i2}, \ldots ,v_{in})$, the best position of individual particles is denoted by $p_{best}=(p_{i1,i2}, \ldots ,p_{in})$, the best global position is $g_{best}=(p_{g1},p_{g2}, \ldots ,p_{gn})$, for the current particle, the current position $x_{id}$ and the current speed $v_{id}$ of this particle is adjusted according to the following formulae:

$$v_{id}(t+1) = \omega v_{id}(t) + c_1(p_{id} - x_{id}) + c_2(p_{gd} - x_{id})$$

$$x_{id}(t+1) = x_{id}(t) + v_{id}(t+1)$$

$$\begin{cases} v_{id} = v_{max}, v_{id} > v_{max} \\ v_{id} = -v_{max}, v_{id} < -v_{max} \end{cases}$$

where:
$p_{id}$ is the current best position of individual particles;
$p_{gd}$ is the current best global position;
$v_{max}$ represents the maximum flying speed of particles;
$-v_{max}$ represents the minimum flying speed of particles;
$\omega$ is an inertia weight; and
$c_1$ and $c_2$ are acceleration constants.

All the found full-scale simplexes are approximate best solutions which should be distributed near the real best solution. Therefore, it is necessary to perform local search at a small step size. That is, the value of the maximum speed $v_{max}$ should be small. All approximate fixed points are traversed to obtain a value range $[-x_{jmax}, x_{jmax}]$ of the approximate best solution. That is, the value range of the flying speed is $[-x_{jmax}, x_{jmax}]$. It is assumed that the maximum speed $v_{max}$ is equal to $v_{max} = x_{jmax}$.

A decreasing $c_1$ or increasing $c_2$ learning factor selection strategy is set: approximate fixed points obtained by the simplicial algorithm are distributed near local extreme points of the fixed-point equation. Therefore, in the initial stage of the particle swarm optimization, more attention should be paid on the recognition of individual particles, and a large learning factor $c_1$ is set for in-depth local search. In the later stage of the particle swarm optimization, more attention should be paid on the global best particle, and a large learning factor $c_2$ is set to avoid local convergence.

Similar to the learning factor selection strategy, it is necessary to set a large inertia weight in the early stage, and the inertia weight gradually decreases as the number of iterations increases. Therefore, in this embodiment of the present invention, by a decreasing inertia weight, the value of the weight ω gradually decreases in iterations, specifically:

$$\omega = \omega_{max} - \frac{n \cdot (\omega_{max} - \omega_{min})}{n_{max}},$$

where:

$\omega_{max}$ 0.9; and $\omega_{min} = 0.4$.

An embodiment of the present invention further provides an optimization system for autonomous path planning of an agent in an autonomous system, including an agent. The agent includes:

at least one storage unit; and at least one processing unit;

wherein the at last one storage unit stores at least one instruction that, when loaded and executed by the at least one processing unit, implements the following steps:

S1: acquiring a path optimization function of the agent;

S2: converting, based on fixed-point theorems, the path optimization function of the agent into an equivalent fixed-point equation;

S3: acquiring a complete simplex sequence based on the fixed-point equation; and S4: determining, based on the complete simplex sequence, an initial population size and an initial position of particles for particle swarm optimization to obtain the best path planning of the agent.

In order to test the effectiveness of the method provided in the embodiments of the present invention, the particle swarm optimization algorithm based on the fixed-point theorem provided in the embodiments of the present invention is compared with the standard particle swarm algorithm.

Five multi-agent target collaboration functions are used for this test, including two unimodal functions Sphere and Rosenbrock and three multimodal functions Ackley, Griewanks and Rastrigin. The details are shown in the following Table 1.

TABLE 1

| Basic information about the five multi-agent target collaboration functions | | | | |
| --- | --- | --- | --- | --- |
| Name | Expression | Search space | Accuracy | Global optimum |
| Sphere | $f_1(x) = \sum_{i=1}^{n} x_i^2$ | $[-100, 100]^n$ | 0.01 | $[0, 0, \ldots, 0]$ |
| Rosenbrock | $f_2(x) = \sum_{i=1}^{n-1} \left(100(x_i^2 - x_{i+1}^2)^2 + (x_i - 1)^2\right)$ | $[-2.048, 2.048]^n$ | 100 | $[1, 1, \ldots, 1]$ |
| Ackley | $f_3(x) = -20\exp\left(-0.2\sqrt{\frac{1}{n}\sum_{i=1}^{n} x_i^2}\right) - \exp\left(\frac{1}{n}\sum_{i=1}^{n}\cos(2\pi x_i)\right) + 20 + e$ | $[-30, 30]^n$ | 100 | $[0, 0, \ldots, 0]$ |
| Griewanks | $f_4(x) = \sum_{i=1}^{n} \frac{x_i^2}{4000} - \prod_{i=1}^{n} \cos\left(\frac{x_i}{\sqrt{i}}\right) + 1$ | $[-600, 600]^n$ | 0.1 | $[1, 1, \ldots, 1]$ |
| Rastrigin | $f_5(x) = \sum_{i}^{n} (x_i - 10\cos(2\pi x_i) + 10)$ | $[-5.12, 5.12]^n$ | 100 | $[0, 0, \ldots, 0]$ |

To increase the test difficulty of the algorithm, the three multimodal functions are rotated. In this test, a Salomon algorithm is used to generate an orthogonal matrix:

$$M = \begin{pmatrix} m_{11}, m_{12}, & \ldots & , m_{1n} \\ \vdots & \ddots & \vdots \\ m_{n1}, m_{n2}, & \ldots & m_{nn} \end{pmatrix},$$

where $X=[x_1, x_2, \ldots, x_n]$ is the independent variable of the non-rotational function, $Y=[y_1, y_2, \ldots, y_d]=MX$ is the independent variable of the rotated function, and the rotational function is expressed by $f^*(x)$.

The inertia weight w is set as linear decreasing inertia weight. The whole swarm is considered as the neighborhood of particles, and a constrained boundary strategy is used. The parameters for the particle swarm optimization algorithm based on the fixed-point theorem provided in the embodiments of the present invention (the algorithm in the embodiments of the present invention is named FP-PSO) algorithm) are determined based on the result of solving of the fixed-point equations. Integer labeling is used for unimodal functions, and vector labeling is used for multimodal functions and rotational functions. In the standard PSO algorithm, it is set that there are 30 particles in a swarm and that the maximum speed is the width of the value range. The initial state of the swarm is determined randomly. The acceleration constant is $c_1=c_2=2$.

To ensure the test fairness of the algorithm, it is set that the dimensionality of the test function is n=30 and that each test function runs 50 times independently. The algorithm is terminated when the maximum number of iterations is reached. The mean best value and standard deviation of the experimental results are recorded. The non-rotational test function is terminated when $2\times10^5$ function evaluations are reached; and the rotational test function is terminated when $4\times10^5$ function evaluations are reached.

TABLE 2

The mean value and mean standard deviation of the non-rotational function after $2 \times 10^5$ function evaluations in 50 independent experiments

| Algorithm | | Sphere | Rosenbrock | Ackley | Griewanks | Rastrigin |
|---|---|---|---|---|---|---|
| FP-PSO | Mean | $1.81 \times 10^{-15}$ | 8.91 | $8.46 \times 10^{-13}$ | $3.51 \times 10^{-6}$ | $3.58 \times 10^{-2}$ |
| | SD | $6.35 \times 10^{-16}$ | 6.42 | $7.05 \times 10^{-14}$ | $1.22 \times 10^{-6}$ | $6.33 \times 10^{-3}$ |
| PSO | Mean | $4.43 \times 10^{-6}$ | 32.38 | $2.01 \times 10^{-7}$ | $1.77 \times 10^{-3}$ | 14.39 |
| | SD | $8.27 \times 10^{-6}$ | 24.73 | $6.55 \times 10^{-7}$ | $4.78 \times 10^{-3}$ | 10.92 |

TABLE 3

The mean value and mean standard deviation of the rotational function after $4 \times 10^5$ function evaluations in 50 independentexperiments

| Algorithm | | Ackley* | Griewanks* | Rastrigin* |
|---|---|---|---|---|
| FP-PSO | Mean | $6.77 \times 10^{-15}$ | $6.45 \times 10^{-8}$ | $5.82 \times 10^{-5}$ |
| | SD | $1.26 \times 10^{-15}$ | $2.05 \times 10^{-8}$ | $6.14 \times 10^{-6}$ |
| PSO | Mean | $5.42 \times 10^{-9}$ | $4.13 \times 10^{-4}$ | $3.97 \times 10^{-1}$ |
| | SD | $7.86 \times 10^{-9}$ | $8.35 \times 10^{-4}$ | $2.88 \times 10^{-1}$ |

Figure 3A:
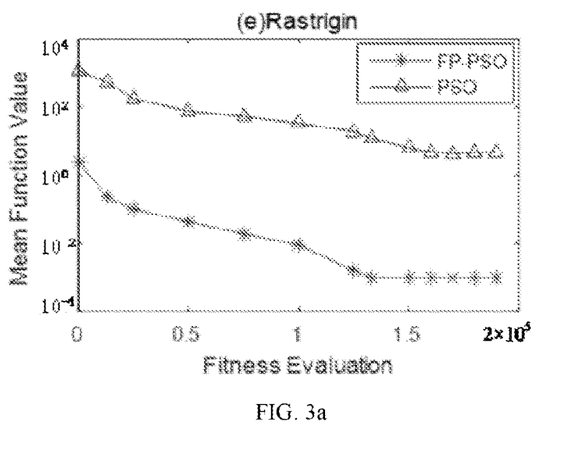
FIG. 3 shows optimization efficiency convergence curves of the method of the present invention and a conventional method, when the target collaboration function is rotational (i.e., in a complex operating environment)
Figure 3B:
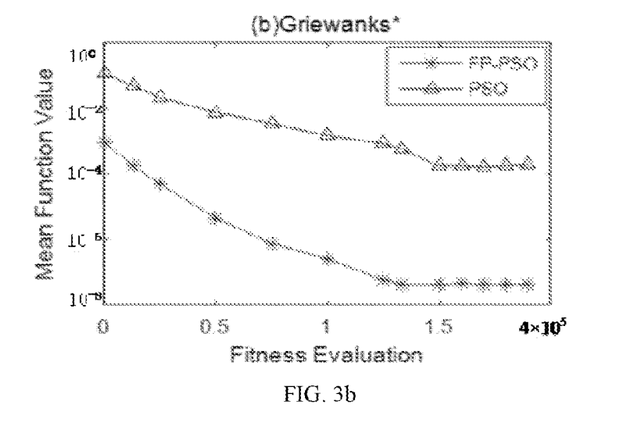
Figure 3C:
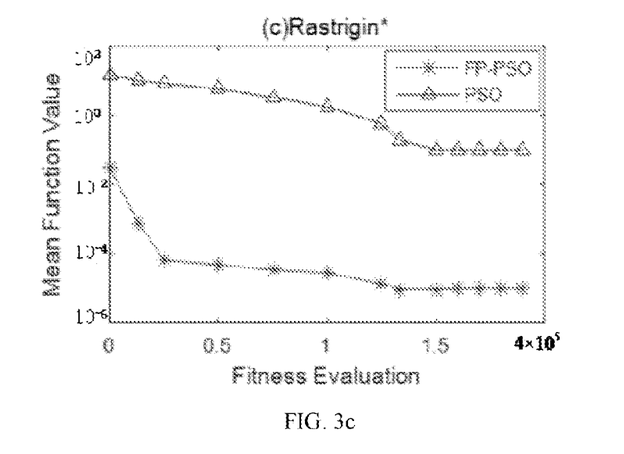

FIG. 2 and FIG. 3 show the convergence curves of the two algorithms in non-rotational and rotational cases, wherein FIG. 2 includes FIGS. 2a, 2b, 2c, 2d and 2e, and FIG. 3 includes FIGS. 3a, 3b and 3c.

Referring to FIG. 2 and FIG. 3, for both non-rotational and rotational test functions, the FP-PSO collaboration method provided in the embodiments of the present invention has better mean convergence speed and mean solution precision than the conventional algorithms. In terms of the solution precision, the approximate fixed points searched by simplicial algorithm are used as the initial population of the particle swarm. The initial state in the FP-PSO algorithm is always obviously superior to the initial state of the population based on random selection in the conventional PSO algorithm. Almost all of the approximate fixed points are distributed on the extreme edge of the function. Each particle can be searched better. The population diversity is increased. The capability of the algorithm to avoid local optimal solutions is enhanced. The search process exhibits the continuously optimized feature. Particularly for the multimodal functions Ackley, Griewanks and Rastrigin that have a large number of local extremes, the search process is barely trapped in local optimum. The solution precision of the FP-PSO algorithm is obviously superior to that of the conventional PSO algorithms. In terms of the solution efficiency, due to the excellent initial state of the population, on one hand, by directional guidance, the flight steps of the population redundancy are greatly reduced; and on the other hand, by narrowing the search space to a great extent, the efficiency of iterative flight is obviously improved. By the FP-PSO algorithm, a high-quality solution can be found at a high convergence speed. Meanwhile, it may be found from the mean standard deviation shown in Table 2 and Table 3 that the FP-PSO algorithm, which uses the set of approximate fixed points as the initial population, has higher operating stability than the conventional PSO algorithms. Even when the complex rotational function is processed, the standard deviation of several experimental results is still obviously superior. It further demonstrates that the FP-PSO algorithm is quite applicable and stable in processing complex problems.

The foregoing embodiments are used to optimize the autonomous path planning of an intelligent robot. The specific process will be described below.

In order to verify the effectiveness of the embodiments of the present invention, the optimization method for path planning provided in the embodiments of the present invention and a conventional particle swarm optimization algorithm are compared in two identical environmental models. During experiments, simulation is performed by using Makline as a platform and Python3-4.4.0 as a programming environment. The experimental hardware is as follows: Intel Core i7, 3.60 GHz CPU, 8 GB, 2T, and windows 7.

Figure 4A:
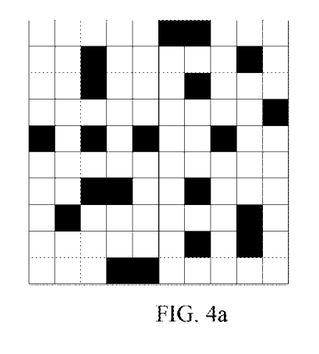
FIG. 4a is a 10×10 grid map.
Figure 4B:
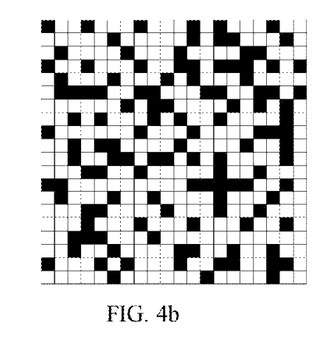
FIG. 4b is a 20×20 grid map.

The motion space for the robot is modeled by a grid method, and a two-dimensional region is divided into a series of smallest grids, basic elements of which are considered as units. The free regions in the two-dimensional region have a value of 0 and the robot can pass through the free regions. The free regions are shown in white in the drawings. Obstacle regions have a value of 1 and the robot cannot pass through the obstacle regions. The obstacle regions are shown in black. FIG. 4a shows a 10×10 grid environment with fewer obstacles and a robot motion space having a larger grid size. FIG. 4b shows a 20×20 grid environment with more obstacles and a robot motion space having a smaller grid size.

It is assumed that m is the number of grids through which the path of the robot passes, and $\alpha_{start}$ and $\alpha_{end}$ are the preset starting grid and ending grid of the motion of the robot. The motion in two adjacent grids must be connected to the center, and the center point is directly measured by Euclidean distance:

$$d(\alpha_i,\alpha_j)=\sqrt{(\beta_{i1}-\beta_{j1})^2+(\beta_{i2}-\beta_{j2})^2+...+(\beta_{im}-\mu_{jm})^2}$$

The path optimization function of the robot is:

$$F = \sum_{i=0}^{m} dist(\alpha_i, \alpha_{i+1}), \alpha_0 = \alpha_{start}, \alpha_{m+1} = \alpha_{end}$$

Goal of path planning: the robot achieves its goal of motion by passing through the minimum number of grids. That is, the function F has a minimum value m.

Figure 5A:
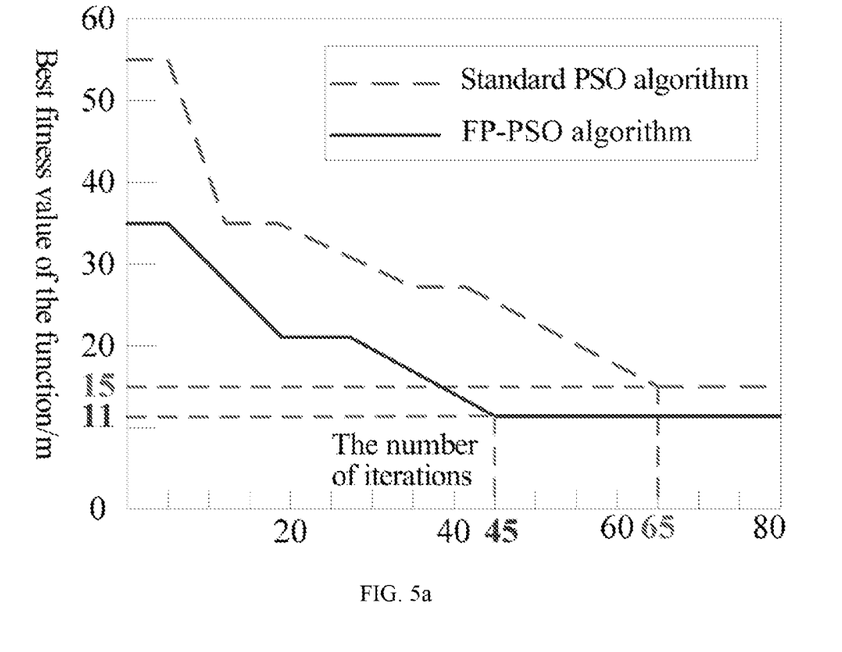
FIG. 5a shows convergence curves of two strategies.
Figure 5B:
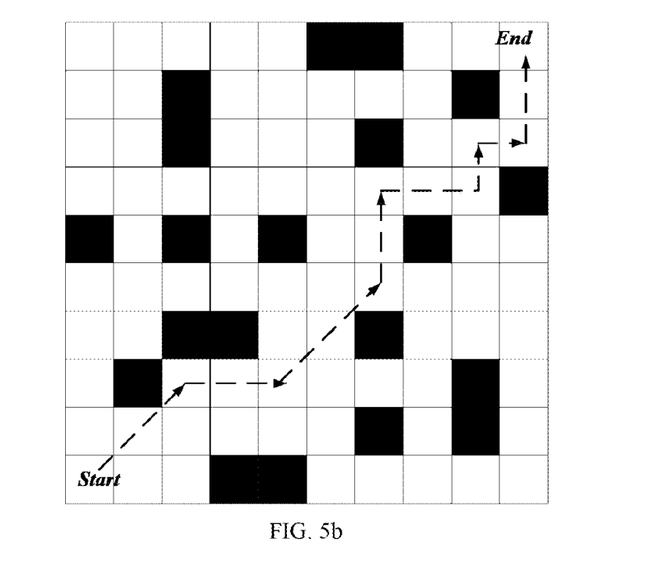
FIG. 5b shows the path planning using a standard PSO algorithm strategy.
Figure 5C:
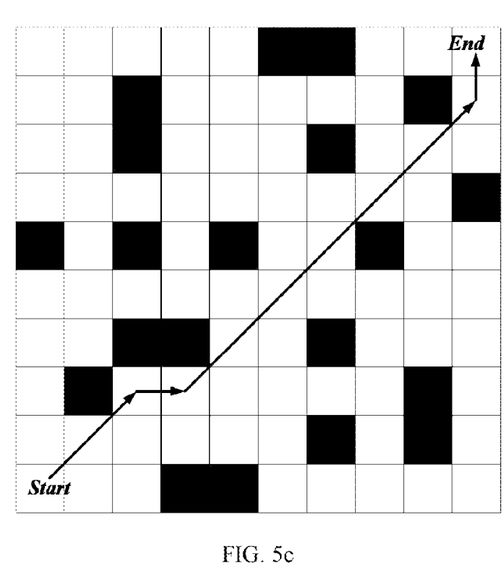
FIG. 5c shows the path planning using a strategy according to an embodiment of the present invention.

For the 10×10 grid map, the value range of m is [0:100], and the parameters for the standard particle swarm optimization are as follows: the number of particles=20, the maximum flying speed $v_{max}$=20, and the particle position is determined randomly. The maximum number of iterations is set as 80, and the experimental results of the two parameter selection strategies are shown in FIG. 5.

Figure 6A:
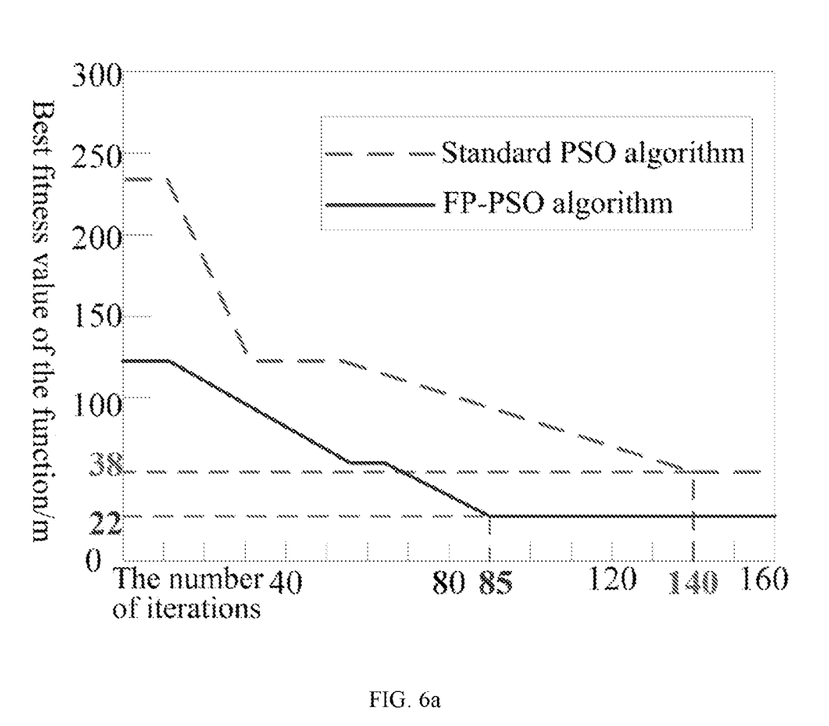
FIG. 6a shows convergence curves of two strategies.
Figure 6B:
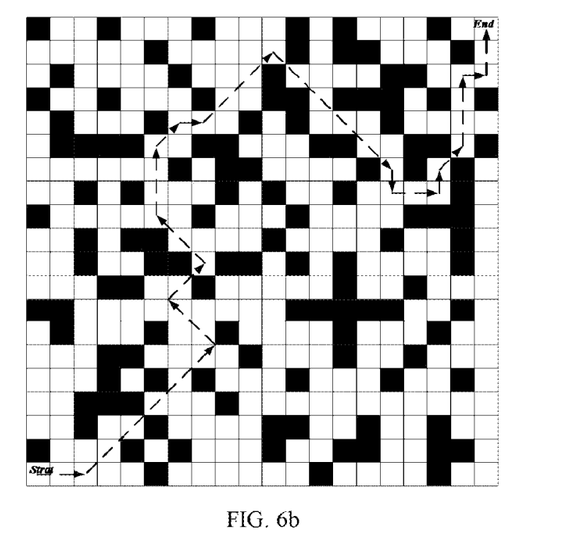
FIG. 6b shows a best path using the standard PSO algorithm strategy.
Figure 6C:
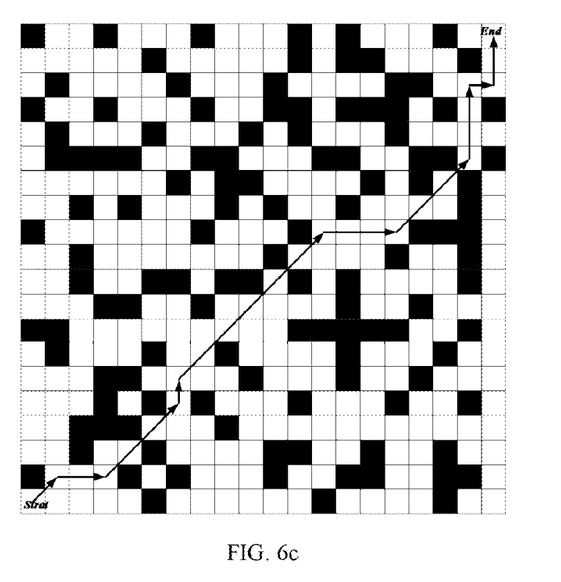
FIG. 6c shows a best path using the strategy according to an embodiment of the present invention.

For the 20×20 grid map, the value range of m is [0:400], and the parameters for the standard particle swarm optimization are as follows: the number of particles=50, the maximum flying speed $v_{max}$=100, and the particle position is determined randomly. The maximum number of iterations is set as 160, and the experimental results of the two parameter selection strategies are shown in FIG. 6.

It is indicated by the experimental results that, by the particle swarm parameter optimization based on the fixed-point simplexes as provided by the present invention, during the process of planning the best path for the robot, the convergence speed and convergence precision are obviously better than those of the standard particle swarm optimization, the robustness is higher, and the effect is more obviousin a complex environment.

In conclusion, compared with the prior art, the present invention has the following beneficial effects.

In the embodiments of the present invention, the extremal optimization of the path optimization function of the agent is converted into solving of the fixed-point equations and initial parameters for particle swarm optimization are determined by the complete simplex sequence. The complete simplex sequence contains almost all extreme points of the path optimization function, so the diversity of population and the effectiveness of the particle search direction are ensured, and the robustness of the agent in the autonomous system during the path planning process and the efficiency in searching the best path are thus improved.

In the embodiments of the present invention, since the initial population is almost distributed near the edge of each extreme point, exploitation is preferred in the early stage of the algorithm to provide a higher local search capability; and development is preferred in the later stage to provide a higher global search capability. Based on this principle, selection strategies for other relevant parameters are set, so that the overall stability of the algorithm can be greatly improved.

In the embodiments of the present invention, the function feasible region is selected by the higher search capability of the simplicial algorithm method, so that the initial parameter quality is improved, and the number of evolutions of the algorithm is reduced. Meanwhile, the fixed-point theorems in the present invention produce powerful conclusions under mild conditions. The convergence in the later stage of the algorithm is balanced by excellent mathematical convergence, and the capability of the particle swarm optimization to avoid local convergence is improved.

It is to be noted that, as used herein, the relational terms such as first and second are used merely for distinguishing one entity or operation from another entity or operation, and do not necessarily indicate or imply any actual relationship or order between these entities or operations. Moreover, the terms "comprise", "include" or any other variants thereof are intended to encompass a non-exclusive inclusion, so that a process, method, article or device that includes a series of elements includes not only these elements, but also other elements not listed explicitly, or elements inherent to this process, method, article or device. Without more restrictions, an element defined by the phrase "comprising a/an . . . " does not exclude the presence of other identical elements in the process, method, article or device that includes this element.

The aforementioned embodiments are provided merely for describing the technical solutions of the present invention, rather than limiting the technical solutions. Although the present invention has been described in detail by the aforementioned embodiments, it should be understood by a person of ordinary skill in the art that modifications may be made to the technical solutions recorded in the aforementioned embodiments or equivalent replacements may be made to some of the technical solutions. All the modifications or replacements will not make the essence of the corresponding technical solutions depart from the spirit and scope of the technical solutions in the embodiments of the present invention.

We claim:

1. A path planning method for self-driving of autonomous system, which is executed by an agent, the method comprising following steps of:

S1: acquiring a path optimization function of the agent based on the driving space of the agent, a speed of the agent, and a current position of the agent;

S2: converting, based on fixed-point theorems, the path optimization function of the agent into an equivalent fixed-point equation;

S3: acquiring a complete simplex sequence based on the fixed-point equation; and S4: determining, based on the complete simplex sequence, an initial population size and an initial position of particles for particle swarm optimization to obtain the best path planning of the agent, and conducting the self-driving of the autonomous system according to the best path planning;

wherein the step S2 is specifically:

based on $$\begin{cases} \min y = f(X) \\ \text{st.} \quad X \in \{X \mid g_i(X) \le 0, i = 1, 2, \ldots, m\} \end{cases},$$

constructing a fixed-point equation F(X)=X−f(X), wherein, according to the fixed-point theorems, f(X*)=0 if X* is a solution to the fixed-point equation, so that a minimum value of the path optimization function y=f(X) at the point X* is obtained;

where:

f(X) is the path optimization function of the agent;

X is an n-dimensional optimization variable; and $g_i(X)$ is m constraint functions in a function feasible region;

according to the fixed-point theorems, introducing an approximate fixed point to replace a precise fixed point: let any ε>0, considering X as an approximate fixed point of the f(X) if |X−f(X)|<ε, where|X−f(X)| represents the modulus of a vector, specifically:

S301: dividing a search space of the fixed-point equation, specifically:

in an n-dimensional Euclidean space $R^n$, dividing a search space of the fixed-point equation into uniform polyhedrons by a n-family straight line $x_i$=$mh_i$ (l=1,2, . . . ,n), where m is precision control;

S302: processing the divided search space by a simplicial algorithm to obtain simplexes, wherein:

for the Euclidean space $R^n$, $N=\{1,2,\ldots,n\}$, $\pi$ is the permutation of N, and n basis vectors $u^1,\ldots,u^n$ of $R^n$, which are n columns in an identity matrix of order n, satisfy the following condition: $u=u^1+\ldots+u^n=(1,\ldots,1)$; let $K_1^0$ be a set of integer points in $R^n$, if $y^0 \in K_1^0$, a n-dimensional simplex $\langle y^0,y^1,\ldots,y^n\rangle$ is denoted by $k_1(y^0,\pi)$, where $y^i=y^{i-1}+u^{\pi(i)}$, $i\in N$, and a set of $k_1(y^0,\pi)$ is denoted by $K_1$; and S303: labeling the simplexes to output a complete simplex sequence, specifically:

labeling the simplexes by integer labeling or vector labeling, obtaining a complete simplex sequence satisfying labeling requirements according to a logistic discrimination, and using a value range of the complete simplex sequence as an updated search space;

wherein the step S4 is specifically:

in an n-dimensional solution space, if the position of each particle is a complete simplex sequence $x_i=(x_{i1}, x_{i2},\ldots,x_{in})$, the number of complete simplex sequences represents the population size, the flying speed is $v_i=(v_{i1},v_{i2},\ldots,v_{in})$, the best position of individual particles is denoted by $p_{best}=(p_{i1}, p_{i2},\ldots,p_{in})$, the best global position is $g_{best}=(p_{g1}, p_{g2},\ldots,p_{gn})$, for the current particle, adjusting the current position $x_{id}$ and the current speed $v_{id}$ of this particle according to the following formulae:

$$v_{id}(t+1) = \omega v_{id}(t) + c_1(p_{id} - x_{id}) + c_2(p_{gd} - x_{id})$$

$$x_{id}(t+1) = x_{id}(t) + v_{id}(t+1)$$

$$\begin{cases} v_{id} = v_{max}, & v_{id} > v_{max} \\ v_{id} = -v_{max}, & v_{id} < -v_{max} \end{cases}$$

where:

$p_{id}$ is the current best position of individual particles;

$p_{gd}$ is the current best global position;

$v_{max}$ represents the maximum flying speed of particles;

$-v_{max}$ represents the minimum flying speed of particles;

$\omega$ is an inertia weight; and $c_1$ and $c_2$ are acceleration constants.

2. The path planning method for self-driving of autonomous system according to claim 1, wherein the value range of the complete simplex sequence is used as a value range of the flying speed.

3. The path planning method for self-driving of autonomous system according to claim 1, wherein the inertia weight is set in the following way:

an inertia decreasing weight is used, the value $\omega$ of which gradually decreases in iterations, specifically:

$$\omega = \omega_{max} - \frac{n \cdot (\omega_{max} - \omega_{min})}{n_{max}},$$

where:

$\omega_{max}=0.9$; and $\omega_{min}=0.4$.

4. A path planning system for self-driving of autonomous system, the agent comprising:

at least one storage unit; and at least one processing unit;

wherein the at last one storage unit stores at least one instruction that, when loaded and executed by the at least one processing unit, implements the following steps:

S1: acquiring a path optimization function of the agent based on the driving space of the agent, a speed of the agent, and a current position of the agent;

S2: converting, based on fixed-point theorems, the path optimization function of the agent into an equivalent fixed-point equation;

S3: acquiring a complete simplex sequence based on the fixed-point equation; and S4: determining, based on the complete simplex sequence, an initial population size and an initial position of particles for particle swarm optimization to obtain the best path planning of the agent, and conducting the self-driving of the autonomous system according to the best path planning;

wherein the step S2 is specifically:

based on $$\begin{cases} \min y = f(X) \\ \text{st.} \ X \in \{X \mid g_i(X) \leq 0, i=1,2,\ldots,m\} \end{cases},$$

constructing a fixed-point equation $F(X)=X-f(X)$, wherein, according to the fixed-point theorems, $f(X^*)=0$ if $X^*$ is a solution to the fixed-point equation, so that a minimum value of the path optimization function $y=f(X)$ at the point $X^*$ is obtained;

where:

$f(X)$ is the path optimization function of the agent;

X is an n-dimensional optimization variable; and $g_i(X)$ is m constraint functions in a function feasible region;

wherein the step S3 is specifically:

according to the fixed-point theorems, introducing an approximate fixed point to replace a precise fixed point: let any $\varepsilon>0$, considering X as an approximate fixed point of $f(X)$ if $|X-f'(X)|<\varepsilon$, where $|X-f'(X)|$ represents the modulus of a vector, specifically:

S301: dividing a search space of the fixed-point equation, specifically:

in an n-dimensional Euclidean space $R^n$, dividing a search space of the fixed-point equation into uniform polyhedrons by a n-family straight line $x_i=mh_i$ ($i=1,2,\ldots,n$), where m is precision control;

S302: processing the divided search space by a simplicial algorithm to obtain simplexes, wherein:

for the Euclidean space $R^n$, $N=\{1,2,\ldots,n\}$, $\pi$ is the permutation of N, and n basis vectors $u^1,\ldots,u^n$ of $R^n$, which are n columns in an identity matrix of order n, satisfy the following condition: $u=u^1+\ldots+u^n=(1,\ldots,1)$; let $K_1^0$ be a set of integer points in $R^n$, if $y^0\in K_1^0$, a n-dimensional simplex $\langle y^0,y^1,\ldots,y^n\rangle$ is denoted by $k_1(y^0,\pi)$, where $y^i=y^{i-1}+u^{\pi(i)}$, $i\in N$, and a set of $k_1(y^0,\pi)$ is denoted by $K_1$; and S303: labeling the simplexes to output a complete simplex sequence, specifically:

labeling the simplexes by integer labeling or vector labeling, obtaining a complete simplex sequence satisfying labeling requirements according to logistic discrimination, and using a value range of the complete simplex sequence as an updated search space;

wherein the step S4 is specifically:

in an n-dimensional solution space, if the position of each particle is a complete simplex sequence $x_i=(x_{i1}, x_{i2}, \ldots, x_{in})$, the number of complete simplex sequences represents the population size, the flying speed is $v_i=(v_{i1}, v_{i2}, \ldots, v_{in})$, the best position of individual particles is denoted by $p_{best}=(p_{i1}, i_2, \ldots, p_{in})$, the best global position is $g_{best}=(p_{g1} p_{g2}, \ldots, p_{gn})$, for the current particle, the current position $x_{id}$ and the current speed $v_{id}$ of this particle is adjusted according to the following formulae:

$$v_{id}(t+1) = \omega v_{id}(t) + c_1(p_{id} - x_{id}) + c_2(p_{gd} - x_{id})$$

$$x_{id}(t+1) = x_{id}(t) + v_{id}(t+1)$$

$$\begin{cases} v_{id} = v_{max}, & v_{id} > v_{max} \\ v_{id} = -v_{max}, & v_{id} < -v_{max} \end{cases}$$

where:
$p_{id}$ is the current best position of individual particles;
$p_{gd}$ is the current best global position;
$v_{max}$ represents the maximum flying speed of particles;
$-v_{max}$ represents the minimum flying speed of particles;
$\omega$ is an inertia weight; and
$c_1$ and $c_2$ are acceleration constants.

* * * * *